Sept. 19, 1961   P. A. HOUGHTON   3,000,567
COMPUTER DEVICES
Filed Dec. 30, 1957
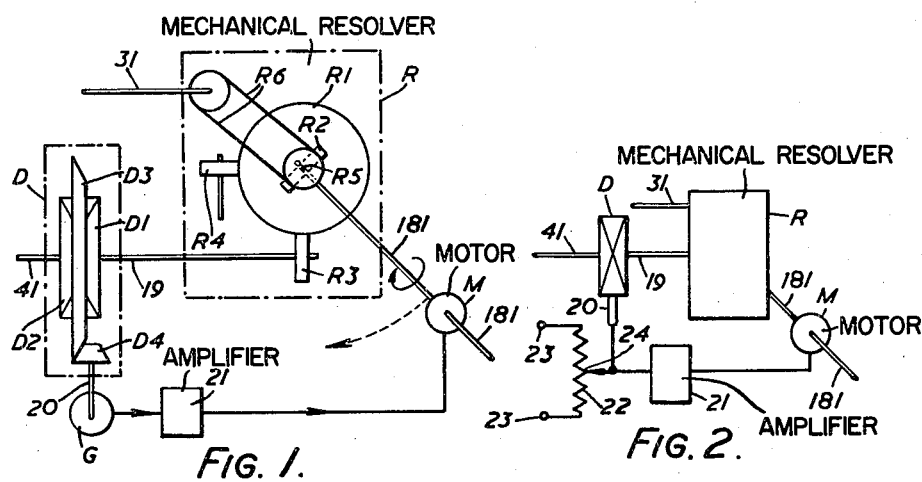
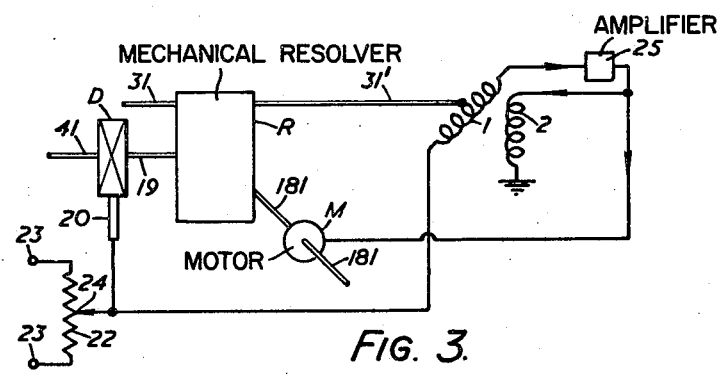
INVENTOR:
Peter Alan Houghton
BY:
Baldwin & Wight
ATTORNEYS

United States Patent Office 3,000,567
Patented Sept. 19, 1961

3,000,567
COMPUTER DEVICES
Peter Alan Houghton, Great Baddow, England, assignor to Marconi's Wireless Telegraph Company Limited, London, England, a British company
Filed Dec. 30, 1957, Ser. No. 705,971
Claims priority, application Great Britain Jan. 14, 1957
2 Claims. (Cl. 235—186)

This invention relates to electro-mechanical computer devices and has for its object to provide a computing device adapted to multiply an input quantity, such as the revolutions per minute of a motor shaft, by a secant or cosecant function to produce an output quantity proportional to the product of these quantities. Computing devices able to do this are of great utility for a variety of purposes, notably in navigation and applied navigation e.g. for the control of moving bodies. In such applications a device able to perform the translation specified is useful for transforming "departure" i.e. Easting or Westing in sea miles into "difference of longitude" i.e. Easting or Westing in minutes of longitude (the terms "departure" and "difference of longitude" are used, with these meanings, in the "Traverse Table" as used by seamen for many years, since, of course, difference of longitude is equal to the departure multiplied by the secant of the middle latitude between the limiting latitudes of the distance traversed.

In accordance with this invention, a computing device comprises a mechanical sine function resolver having an input shaft, a control shaft and an output shaft adapted to run at the product of the speed of the input shaft times a sine function of the angular position of the control shaft with respect to a datum position; a mechanical differential having one input member driven by said output shaft and the other driven at a speed which constitutes the input quantity of the computer device; a potential source controlled by the differential output shaft; an amplifier to apply the output of said potential source to the input of said amplifier the output from said amplifier being applied to energize a motor which drives the input shaft of the mechanical resolver whereby the speed of said input shaft is proportional to the product of the input quantity times the secant of the angular position of the control shaft.

A sine function resolver means any device adapted to translate a quantity fed thereto into a quantity proportional to the product of said quantity into the sine (or cosine) of the angle through which a control member of said device is moved. Examples of electrical sine function resolvers are so-called sine-cosine potentiometers and so-called synchro-resolvers.

The invention is illustrated in the accompanying drawings which shows in simplified diagrammatic manner three embodiments thereof.

Referring to FIG. 1 of this invention which shows one embodiment of this invention in which a mechanical resolver R of any convenient type known per se is employed. That which is illustrated comprises a sphere R1 and three friction discs R2, R3, R4 whose rims are in friction contact with the sphere at the ends of three mutually perpendicular radii of said sphere. The disc R2 is on a shaft 181 which can be rotated by a motor M (if desired through a reduction gear, not shown) and the said disc can be rotated about the radial axis of the sphere represented by the dot R5 by a shaft 181. This rotation is conventionally represented as effected through the medium of a belt R6, the shaft 181, with its driving motor, swinging about the axis R5 as indicated by the broken line arrow, when shaft 31 is rotated. If $n$ be the speed of rotation of the shaft 31 and the angle between the shaft 31 and a datum position for that shaft is $a$ then, as will be seen, the speed of one of the two discs R3, R4 will be $n \sin a$ and that of the other will be $n \cos a$. Either of these shafts may be used to constitute the output drive shaft of the resolver, depending upon whether the final output is required to be a secant function or a cosecant function. In FIG. 1 the disc R3 is in use.

The relation between the input and the output quantity is as follows:

Suppose shaft 181 is the output shaft and the input shaft is 41. Suppose, further, that the shaft 31 is at an angle $a$ relative to a datum, then the shaft 19 has a speed $n \cos a$. This shaft and the input shaft 41 feed the mechanical differential D which is coupled to the generator G. This generator provides an output signal which is proportional to the error speed $(N - n \cos a)$. This signal is fed through amplifier 21 having a gain, A, to motor M, the speed of which is proportional to that of generator G. Thus we have $$n = A(N - n \cos a) \qquad 1$$

Since $\cos A = 1/\sec A$, then dividing both sides of Equation 1 by A and by adding $n \cos a$ to both sides of the equation produces the following equation:

$$\frac{n}{A} + n \cos a = N \qquad 2$$

Now substituting the previously mentioned trigonometric identity:

$$\frac{n}{A} + n\frac{1}{\sec a} = N$$

Factoring $n$ from the two terms of the left-hand side of the equation:

$$n\left(\frac{1}{A} + \frac{1}{\sec a}\right) = N \qquad 4$$

Now employing as a common denominator for the terms contained in the parenthesis the product of the two denominators and by multiplying both sides of the equation by the reciprocal of this term:

$$n = \left(\frac{NA \sec a}{A + \sec a}\right) \qquad 5$$

Multiplying the numerator and the denominator by $1/A$:

$$n = \frac{N \sec a}{1 + \frac{\sec a}{A}} \qquad 6$$

Disc R3 drives through a shaft 19 one of the sun wheels D1 of a differential gear D whose other sun wheel D2 is driven by the shaft 41. The speed of the shaft 41 is the input quantity which is required to be translated into an output quantity, which is also the speed of a shaft, and is proportional to the secant or cosecant (as may be required) of the speed of the shaft 41. The planet wheel cage of the differential D rotates a gear wheel D3 which drives a generator G through bevel gear D4 and shaft 20. The generator output, after amplification by an amplifier 21 energizes the motor M. The motor shaft 181 constitutes the output shaft of the device and it will be seen that if N is the speed of the shaft 41 and $a$ is the angular position of rotation of shaft 31 with respect to a datum position of rotation, the speed of shaft 181 will be N sec $a$ or N cosec $a$ depending upon which of the two driven discs of the resolver is coupled to drive the sun wheel D1 of the differential.

FIG. 2 shows a modification of the arrangement of FIG. 1 the modification consisting in replacing the generator G by a potentiometer resistance 22 between whose terminals 23 an alternating voltage is applied and whose slider 24 is moved by the differential driven shaft 20 and controls the voltage into the motor M. The differential and resolver of FIG. 2 are as in FIG. 1 but are shown, for simplicity of drawing, as blocks merely. The shafts having the same references as in FIG. 1 are the same shafts.

FIG. 3 shows another, and at present preferred, embodiment. Here the input shaft 41 and the shaft 19 of the resolver R drive the sun wheels of a differential D whose output shaft 20 moves the slider 24 on a potentiometer resistance 22 as in FIG. 2. Alternating potential is applied at terminals 23 as before. Output from the slider 24 is, however, fed to one end of the rotor coil 1 of an electrical synchro-resolver having a rotor winding 191 and a main winding 192. The shaft 31 which, as before, swings the driving shaft 181 of the mechanical resolver R, also rotates the rotor carrying the winding 191. This drive is conventionally represented by showing the shaft 31 continued through the resolver R as indicated at 31'. The rotor winding 191 is connected between the slider 24 and the input side of an amplifier 25 the output from which is fed to main winding 192 and also to the motor M driving the shaft 181. As in FIGS. 1 and 2, the output shaft is the shaft 181 and its speed will be proportional to $N \sec a$ or $N \csc a$ (according to which driven shaft of the resolver R is used) where $N$ is the speed of rotation of shaft 41 and $a$ is the angular position of shaft 31 from a datum position.

Considering the device of FIGURE 3 as a positional servo mechanism, it will be seen that the ratio of the velocity ratio (from motor shaft 181 to differential shaft 20) to the voltage gain (from potentiometer slider 24 to motor M is constant irrespective of the value of $a$. This has the important consequence that the servo "striction angle" (referred to the output shaft 181), the natural frequency and the frictional damping ratio are constant for all values of secant $a$ (or cosecant $a$ as the case may be). This much simplifies design and results in an operating characteristic which is exactly what is required in many cases, e.g. where the shaft 181 is used to drive a counting display which is required to behave in a uniform manner irrespective of the value of $a$.

In the claims which follow the term "secant function" is used, for the sake of brevity, to include secant and cosecant and the term "sine function" is similarly used to include sine and cosine.

I claim:
1. A computing device comprising an electro-mechanical sine function resolver having a resolver input shaft, a resolver control shaft and a resolver output shaft adapted to run at the product of the speed of the resolver input shaft times a sine function of the angular position of the resolver control shaft with respect to a datum position; motor means for applying an input to said resolver input shaft; a mechanical differential having first and second input members and an output shaft, said first input member being driven by said resolver output shaft; an input means connected to said second input member, the speed of rotation of said second input member constituting the input quantity of the computer device; a potential source connected to the differential output shaft; an amplifier; means for applying the output of said potential source to the input of said amplifier, means for applying the output from said amplifier to said motor means to drive the resolver input shaft whereby the speed of said resolver input shaft is proportional to the product of the input quantity times the secant of the angular position of the resolver control shaft.

2. A computing device comprising an electro-mechanical sine function resolver having a resolver input shaft, a resolver control shaft and a resolver output shaft adapted to run at the product of the speed of the input shaft times a sine function of the angular position of the control shaft with respect to a datum position; a differential having a first and a second input member and a differential output shaft, said second input member being driven by said resolver output shaft, means to apply an input quantity to said first input member, said first input member being driven at a speed which constitutes the input quantity of the computer device; a potential source controlled by the differential output shaft; a motor, means for applying the output of said source to energize said motor, which motor drives the resolver input shaft whereby the speed of said resolver input shaft is proportional to the product of said input quantity and the secant of the angular position of the control shaft.

References Cited in the file of this patent
UNITED STATES PATENTS

| 2,406,836 | Holden | Sept. 3, 1946 |
| 2,467,646 | Agins | Apr. 19, 1949 |
| 2,815,169 | McKenney | Dec. 3, 1957 |
| 2,858,980 | Bargmann | Nov. 4, 1958 |

OTHER REFERENCES

Electrical Manufacturing, March 1953, "Electrical Resolvers," by Kavis, pp. 128–133.

Control Engineering, October 1954, "The Component Integrator," by Burgess, pp. 32–34.